United States Patent
Baum

[15] 3,650,782
[45] Mar. 21, 1972

[54] BOROSILICATE GLASS FOR PRODUCING ARTICLES BY CENTRIFUGAL CASTING

[72] Inventor: Wilhelm Baum, Mainz-Mombach, Germany

[73] Assignee: Siemens Aktiengesellschaft, Berlin, Germany

[22] Filed: Sept. 16, 1969

[21] Appl. No.: 858,267

[30] Foreign Application Priority Data

Sept. 17, 1968   Germany ..................P 17 96 183.0

[52] U.S. Cl.................................................106/54, 106/48
[51] Int. Cl..............................................................C03c 3/04
[58] Field of Search........................................106/54, 50, 48

[56] References Cited

UNITED STATES PATENTS 2,478,626   8/1949   Grigorieff ..............................106/54
3,420,684   1/1969   Hagedorn ..............................106/54

Primary Examiner—Tobias E. Levow
Assistant Examiner—W. R. Satterfield
Attorney—Curt M. Avery, Arthur E. Wilfond, Herbert L. Lerner and Daniel J. Tick

[57] ABSTRACT

Glass for producing articles by centrifugal casting composed essentially of 60% $SiO_2$, 18% $B_2O_3$, 7% MgO, 6% $Li_2O$, 4% $Al_2O_3$, 3% BaO, 1% CaO and 1% $K_2O$, within tolerances of about ±2 percent, all of the percentages being by weight; and article formed by helium-tight, stress-free fusion of the glass with an Fe—Ni—Co alloy.

2 Claims, 3 Drawing Figures

BOROSILICATE GLASS FOR PRODUCING ARTICLES BY CENTRIFUGAL CASTING

My invention relates to the production of glass. Thick-walled glass cylinders with wall thicknesses of about 3 mm. or more cannot be drawn in the form of tubes nor blown into a given shape when the required diameter of the glass cylinders is greater than 60 mm. and the outer wall surface thereof is to have specific contours such as grooves or flutes, flanges or shields, for example, as in insulators. Centrifugal casting is the most suitable process for producing such glass housings and comprises pouring a quantity of liquid glass into a rotating mold and forming it by centrifugal force into a centrifugal casting. The centrifugal casting process is especially desirable for use when glass vessels are to be provided, for example, at the ends or in the interior thereof, with metal members partly or entirely fused thereto, as are required for example, in electronic transmitting tubes and discharge and switching or control tubes that are to be reproduced accurately and in quantity.

Of course, all types of glass cannot be cast in a centrifuge. In fact, the choice of glasses is very limited when specific requirements as to the processing temperature or as to coefficients of expansion must be imposed, as is the case, for example, with glass-to-metal fused articles. It has, moreover, been found that a specific glass which is suitable for centrifugal casting may nevertheless not be suited for producing an article of any desired shape and, especially, of any desired diameter. Thus, for example, an alkali borosilicate glass having the composition 61% $SiO_2$, 25% $B_2O_3$, 9.5% $Na_2O$, 3.5% $Al_2O_3$ and 1% $Li_2O$, all percentages being by weight, requiring a casting temperature of 1,450° C. and suited for producing thick-walled glass containers having a diameter of 150 mm., cannot be used for producing glass cylinders having a diameter of 120 mm. or less. Cylinders with diameters of 120 mm. or less centrifugally cast from glass of this known composition are subjected to highly erratic and nonuniform internal stresses, notwithstanding the exercise of most painstaking cooling procedures, and scale-like cracks and fissures are consequently formed therein. The causes thereof are not attributable to failings in manufacturing techniques but rather to the structure of the glass being used, i.e., primarily to the viscosity-temperature ratio thereof.

It is accordingly an object of my invention to provide glass having a composition permitting the production therefrom of thick-walled glass cylinders of specific diameter by centrifugal casting and which is additionally especially suited for being fused stress-free to an Fe—Ni—Co alloy, especially one having a thermal coefficient of expansion $\alpha = 63$ to $66 \cdot 10^{-7}/°$ C. in a temperature range of about 20° to 400° C. Such Fe—Ni—Co alloys are conventionally known by the trade names Kovar and Vacon, for example.

It is further object of my invention to provide glass of such composition as well, in comparison to the aforementioned alkali borosilicate glass and without any material difference in the expansion characteristics of the glasses, provide a lower viscosity within the processing temperature range so as to thereby improve the flow characteristic of the glass.

With the foregoing and other objects in view, I provide in accordance with my invention glass for producing articles by centrifugal casting composed essentially of 60% $SiO_2$, 18% $B_2O_3$, 7% MgO, 6% $Li_2O$, 4% $Al_2O_3$, 3% BaO, 1% CaO and 1% $K_2O$, within tolerances of about ±2 percent, all of the percentages being by weight.

The tolerance given in percentage relates to the respective component of the mixture of substances from which the glass of my invention is made. The tolerances can be further defined by limiting the deviation of the coefficient of expansion to no more than $\pm 2 \cdot 10^{-7}/°$ C. from the nominal value thereof for the glass of my invention. In producing the glass of my invention, the alkali and earth alkali oxides are preferably administered as carbonates, nitrates or sulfates.

In the glass of my invention, the boron content of the aforementioned alkali borosilicate glass is partly replaced by $Mg^{2+}$ and $Ba^{2+}$, and the $Na^+$ thereof by $Li^+$. Furthermore, to match the expansion characteristic of the glass of my invention to that of the alkali borosilicate glass, $K_2O$ and CaO have been added to the components forming the glass of my invention. Not only is the desired expansion coefficient thereby attained, but also the molding or pouring temperature is reduced thereby from 1,450° to 1,320° C., which signifies a considerable reduction in wear of the fire-resistant material of the melting crucible and of the mold proper. The glass of my invention, which has a diffusion constant for helium, that is exceptionally small, is therefore outstandingly suited for producing thick-walled (5 to 25 mm. or more thickness) glass cylinders having a diameter of 50 to 200 mm. or more and for being fused virtually helium-tightly and free of stress to members formed of Fe—Ni—Co alloy as well as of $Al_2O_3$.

Thus, in accordance with another aspect of my invention, I provide an article formed of an Fe—Ni—Co alloy member and the glass of my invention fused one to another helium-tightly and free of stress.

Other features which are considered as characteristic for the invention are set forth in the appended claims.

Although the invention is illustrated and described herein as glass for producing articles by centrifugal casting and article produced therewith, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing, in which.

Figure 1:
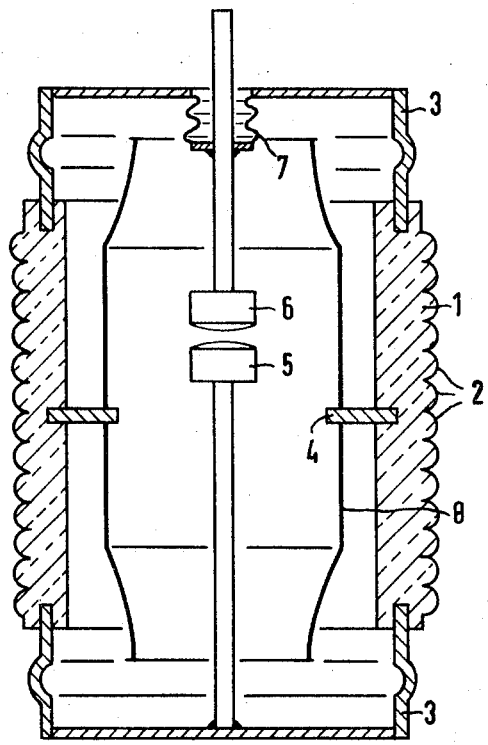
FIG. 1 is a longitudinal sectional view of a vacuum switch constructed in accordance with the invention of this application.

Referring now to the drawings and first, particularly, to FIG. 1 thereof, there is shown a vacuum switch having a housing 1 formed of glass having the composition in accordance with my invention. The glass housing 1 is of cylindrical shape and has a corrugated or rippled outer surface 2. Metal cylinders 3 of an Fe—Ni—Co alloy are fused, during manufacture of the housing to the ends of the glass cylinder 1. Substantially, at the center of the glass cylinder 1, also during manufacture of the housing, there is fused to the inner surface of the glass cylinder 1, an Fe—Ni—Co ring 4 which is thus provided as a holder or support for components of the switch. The switch components, shown in the embodiment of FIG. 1, are a fixed electrode or contact 5, a displaceable electrode or contact 6, a bellows 7 to which the displaceable contact 6 is fixed and a protective cylinder 8 of metal surrounding the contacts or electrodes 5 and 6 so as to protect the glass cylinder 1 from metallic dust originating at the electrodes 5 and 6. The entire space defined by the glass cylinder 1 and the metal cylinders or sleeves 3 fused to the ends of the glass cylinder 1, is evacuated, for example, to $10^{-10}$ Torr. In the illustrated embodiment, the protective cylinder 8 is supported by the Fe—Ni—Co ring 4, and the contact 5 is fixed to one of the Fe—Ni—Co cylinders 3 by an elongated arm and accordingly supported by that cylinder 3, while the contact 6, through the bellows 7 to which it is secured by an elongated arm, is fixed thereby to the other Fe—Ni—Co cylinder 3.

Figure 2:
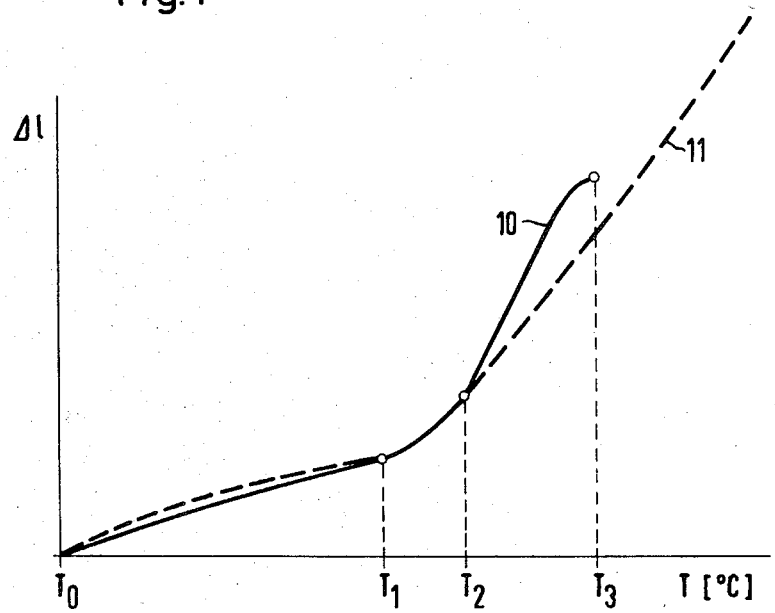
FIG. 2 is a plot diagram showing the expansion characteristic of the glass of my invention compared to that of an Fe—Ni—Co alloy.

In FIG. 2, the expansion characteristics of a centrifugally cast glass are shown in a graph. The abscissa of the graph represents temperature T in degrees centigrade, and the ordinate change in elongation $\Delta 1$ in suitable units of length. From room temperature $T_0$ to the so-called lower cooling point $T_1$, the glass of my invention expands substantially linearly along the solid line curve 10 of FIG. 2. A substantially linear expansion of the glass also occurs between the upper cooling point $T_2$ and the point of fusion $T_3$. Thus, the glass having the novel composition according to my invention, only exhibits a nonlinear change in elongation for temperatures varying between $T_1$ and $T_2$. Since normal metals generally exhibit a predominately linear change in elongation throughout, a special alloy must be provided for fusing in glass. For example, the known Fe—Ni—Co alloy, obtainable in the trade under the trade names Vacon or Kovar, is especially suited for this purpose. The expansion characteristic of such an alloy is depicted in FIG. 2 by the broken line 11. It can be observed from FIG. 2, that the alloy and the glass of my invention have substantially the same expansion characteristic between the temperatures $T_0$ and $T_2$.

In the production of glass articles with a glass having the composition according to my invention, the raw materials are initially melted and insofar as necessary, the previously processed metal components or fittings that are being fused with the glass are inserted in the mold provided for centrifugal casting. It may be desirable to glaze the metal components beforehand with a layer of the glass that is between substantially 50 and 200 $\mu$ thick at the locations at which the metal components are to be fused to the main glass body. The molten glass is then poured into the mold which has been suitably heated. The mold should be reasonably hot, though cooler than the glass, because otherwise the glass would adhere to the mold.

Figure 3:
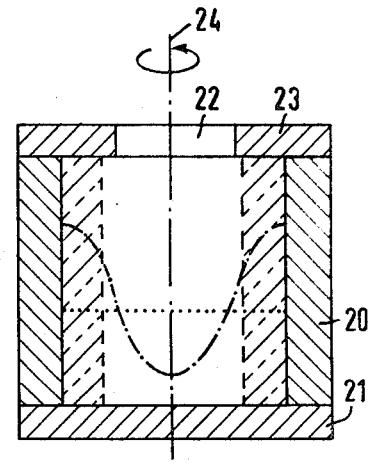
FIG. 3 is a longitudinal sectional view of a mold for centrifugally casting the glass of my invention.

In FIG. 3, there is shown in section, a cylindrical mold for use in centrifugally casting the glass of my invention. The mold is constructed of a cylindrical wall 20 supported on a base plate 21 and covered by a cover plate 23 formed with an opening 22. The molten glass is located at first completely on the base plate 21 of the mold substantially below the horizontal dotted line shown in FIG. 3. As the mold is centrifugally rotated in the rotary direction of the curved arrow about the axis 24, the liquid glass gradually rises along the cylindrical wall 20 and the surface thereof assumes the position represented by the dot-dash line in FIG. 3 at one stage during the rising of the glass, and finally comes into engagement with the cover plate 23. The glass thus assumes the cylindrical form whose inner surface is represented by the dash lines in FIG. 3 when the mold is rotated at a sufficient given rotary speed, and an open area is formed in the glass that had previously lain on the base plate 21. Centrifuging is maintained at this given rotary speed until the glass has hardened. Thereafter, the mold is opened and the glass cylinder is finely cooled in a furnace. The furnace temperature is adjusted to substantially the upper cooling point $T_2$ as shown in FIG. 2. By finely cooling the centrifuged glass cylinder, stress equalization is produced therein between the temperatures $T_2$ and $T_1$, as the temperature slowly decreases.

I claim:

1. Glass for producing articles by centrifugal casting composed essentially of 60% $SiO_2$, 18% $B_2O_3$, 7% $MgO$, 6% $Li_2O$, 4% $Al_2O_3$, 3% $BaO$, 1% $CaO$ and 1% $K_2O$ within tolerances of about ±2 percent, all of the percentages being by weight.

2. Glass according to claim 1, having as tolerance a deviation in the coefficient of expansion thereof of no more than ±2 · $10^{-7}$/° C. from a nominal coefficient of expansion.

* * * * *